(12) United States Patent
Knorr et al.

(10) Patent No.: US 11,333,504 B2
(45) Date of Patent: May 17, 2022

(54) METHOD AND DEVICE FOR UPDATING A DIGITAL MAP FOR VEHICLE NAVIGATION

(71) Applicant: Robert Bosch GmbH, Stuttgart (DE)

(72) Inventors: Moritz Michael Knorr, Hildesheim (DE); Alexander Geraldy, Hildesheim (DE); Christian Skupin, Garbsen (DE); Daniel Zaum, Sarstedt (DE); Emre Cakar, Hannover (DE); Hanno Homann, Hannover (DE); Holger Mielenz, Ostfildern (DE); Isabella Hinterleitner, Hildeshiem (DE); Jochen Marx, Emmerke (DE); Lukas Klejnowski, Burgdorf (DE); Markus Langenberg, Hannover (DE); Michael Pagel, Bad Liebenzell (DE)

(73) Assignee: Robert Bosch GmbH, Stuttgart (DE)

( * ) Notice: Subject to any disclaimer, the term of this patent is extended or adjusted under 35 U.S.C. 154(b) by 327 days.

(21) Appl. No.: 16/493,460

(22) PCT Filed: Mar. 14, 2018

(86) PCT No.: PCT/EP2018/056425
§ 371 (c)(1),
(2) Date: Sep. 12, 2019

(87) PCT Pub. No.: WO2018/167164
PCT Pub. Date: Sep. 20, 2018

(65) Prior Publication Data
US 2020/0132475 A1    Apr. 30, 2020

(30) Foreign Application Priority Data

Mar. 16, 2017 (DE) .......................... 102017204357.1

(51) Int. Cl.
*G01C 21/32* (2006.01)
*G01S 13/89* (2006.01)

(52) U.S. Cl.
CPC .............. *G01C 21/32* (2013.01); *G01S 13/89* (2013.01)

(58) Field of Classification Search
CPC ..................................................... G01C 21/32
(Continued)

(56) References Cited

U.S. PATENT DOCUMENTS 9,612,123 B1 *  4/2017  Levinson ............... G01C 21/32
9,746,352 B2 *  8/2017  Petroski ................. H04B 13/02
(Continued)

FOREIGN PATENT DOCUMENTS

DE    102006061390 A1    7/2008
DE    102015014191 A1    5/2016

OTHER PUBLICATIONS

International Search Report for PCT/EP2018/056425, dated Jun. 20, 2018.

*Primary Examiner* — Peter D Nolan
*Assistant Examiner* — Luke Huynh
(74) *Attorney, Agent, or Firm* — Norton Rose Fulbright US LLP; Gerard Messina

(57) ABSTRACT

A method is described for updating a digital map for vehicle navigation. The method includes a step of determining an adjustment signal for adjusting a detection range of an environment sensor of a vehicle to a section of an environment of the vehicle that corresponds to an area of the digital map to be updated, using an item of information about the area to be updated, and the method including a step of supplying area data for updating the digital map, the area data representing an image of the section of the environment detected by the environment sensor.

10 Claims, 1 Drawing Sheet

(58) Field of Classification Search
USPC .......................................................... 701/300
See application file for complete search history.

(56) References Cited

U.S. PATENT DOCUMENTS

2016/0259335 A1* 9/2016 Oyama ................ G05D 1/0251
2016/0259814 A1* 9/2016 Mizoguchi ......... G01C 21/3837

* cited by examiner

METHOD AND DEVICE FOR UPDATING A DIGITAL MAP FOR VEHICLE NAVIGATION

FIELD OF THE INVENTION

The present invention is based on a device or a method for updating a digital map for vehicle navigation. A computer program is also a subject matter of the present invention.

BACKGROUND INFORMATION

Digital maps are used for vehicle navigation purposes.

SUMMARY

Against this background, the introduced approach provides a method for updating a digital map for vehicle navigation and also a device which uses this method; in addition, it relates to a corresponding computer program.

When a sensor of a vehicle is adjusted in such a way that the sensor detects especially a section in the environment of the vehicle that corresponds to an area of a digital map to be updated, then the map material on which the digital map is based is able to be updated in a very goal-oriented manner.

A method for updating a digital map for vehicle navigation includes the following steps:

Determining an adjustment signal for adjusting a detection range of an environment sensor of a vehicle to a section of an environment of the vehicle which corresponds to an area of the digital map to be updated, utilizing information about the area to be updated; and Supplying area data for updating the digital map, the area data representing an image of the section of the environment detected by the sensor.

The digital map may include map material that is present in digital form and which is able to be used by a navigation system or a driver-assistance system of a vehicle, for example. The vehicle could be a road vehicle such as a passenger car. The area to be updated may define an area of the digital map in which the map material is outdated or no longer available and is to be updated using area data detectable by a sensor. This may be an environment sensor of a vehicle, which is used for detecting the environment of the vehicle. The area to be updated, for example, may be defined by coordinates of a coordinate system that forms the basis of the digital map. The sensor can be a sensor having an adjustable range and/or an adjustable opening angle. The adjustment signal may involve a signal that is suitable for adjusting at least one adjustment parameter of the sensor. For example, the adjustment parameter is able to be employed to adjust the opening angle, a detection direction, or the range of the sensor. The area data may represent raw sensor data supplied by the sensor or sensor data that has already been processed.

The present method may have a step of reading in an update signal, which has the information about the area of the digital map to be updated. The update signal is able to be supplied by a device which manages the map material that forms the basis of the digital map. In this way, the information pertaining to the area to be updated is able to be transmitted to vehicles which are suitable for detecting the area data.

In the step of reading in, the update signal is able to be read in via an interface to a vehicle-external management device for managing the digital map. A back end server may then be used for the central output of the update signal. In addition, the area data are able to be made available to the interface to the vehicle-external management device, which thus allows for a central management of the digital map.

In a step of selecting, the sensor is able to be selected with the aid of the update signal. As a result, the particular sensor best suited for detecting the relevant section of the environment of the vehicle may be selected from among the multiple sensors available in the vehicle.

The present method may include a step of checking, in which it is checked whether the sensor is used by a driver-assistance system. A current and/or an imminent use of the sensor is checkable in the process. If the sensor is required by at least one driver-assistance system, then this sensor may be excluded from the detection of the area data. If the sensor is not required, however, then the sensor is able to be made available for detecting the area data. Thus, it is possible to choose whether or not to carry out the adjustment signal as a function of a result of the step of checking.

For example, the adjustment signal may be determined in order to adjust an opening angle of the sensor. With the aid of the opening angle, it may be defined whether the sensor detects a section of the environment that is close by or a section of the environment that lies at a distance.

The step of determining the adjustment signal is able to be carried out using a position signal that indicates a position and an orientation of the vehicle. In this way it can be ensured that the sensor does indeed detect the section of the environment of the vehicle that corresponds to the area of the digital map to be updated.

The present method may include a step of detecting the area data with the aid of the sensor. In an advantageous manner, it is therefore possible to use a sensor that is already installed in the vehicle as it is, such as a camera or a radar sensor, for updating the digital map.

This method is able to be implemented in software or hardware, for instance, or in a mixed form of software and hardware, e.g., in a control unit.

Moreover, the approach introduced here provides a device which is developed to execute, actuate or implement the steps of a variant of a method presented here in corresponding devices. This embodiment variant of the present invention in the form of a device is also able to achieve the object on which the present invention is based in a rapid and efficient manner.

Toward this end, the device may include at least one computing unit for processing signals or data; at least one memory unit for storing signals or data; at least one interface to a sensor or an actuator for reading in sensor signals from the sensor or for outputting data or control signals to the actuator; and/or at least one communications interface for reading in or outputting data which are embedded in a communications protocol. The computing unit, for example, may be a signal processor, a microcontroller or the like, and the memory unit may be a flash memory, an EEPROM or a magnetic memory unit. The communications interface may be developed to read in or output data in a wireless and/or a wire-conducted manner, and a communications interface which is able to read in or output the wire-conducted data reads in these data, electrically or optically, from a corresponding data-transmission line or outputs the data to a corresponding data-transmission line.

In this instance, a device may be understood as an electrical device which processes the sensor signals and outputs control and/or data signals as a function thereof. The device may include an interface which may be developed in the form of hardware and/or software. In a hardware embodiment, the interfaces may be part of what is known as a system ASIC, for instance, which includes a number of different functions of the device. However, it is also possible that the interfaces are autonomous, integrated switching circuits or are at least partially made up of discrete components. In a software development, the interfaces may be software modules which are provided on a microcontroller in addition to other software modules, for example.

Also advantageous is a computer program product or a computer program having program code, which is able to be stored on a machine-readable carrier or memory medium such as a semiconductor memory, a hard disk memory or an optical memory and is used for executing, implementing and/or actuating the steps of the present method according to one of the afore-described embodiments, in particular if the program product or program is executed on a computer or a device.

DETAILED DESCRIPTION

Figure 1:
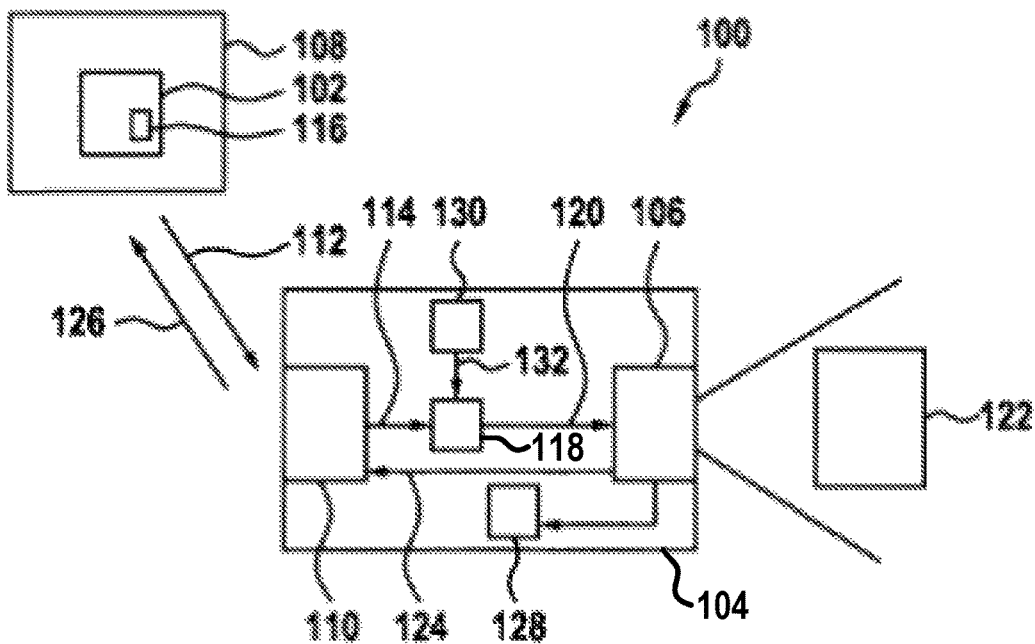
FIG. 1 shows a schematic illustration of a device for updating a digital map for vehicle navigation according to an exemplary embodiment.

In the following description of advantageous exemplary embodiments of the present invention, identical or similar reference numerals have been used for the illustrated elements or the elements that are shown in the different figures that have a similar effect, and a repeated description of these elements has been omitted.

FIG. 1 shows a schematic illustration of a device 100 for updating a digital map 102 according to one exemplary embodiment.

Shown is a vehicle 104 which includes a sensor 106, which is used for updating digital map 102 in this exemplary embodiment. According to this exemplary embodiment, digital map 102, or map material on which digital map 102 is based, is stored in a vehicle-external management device 108, e.g., in the form of a server.

Device 100 includes a read-in device 110, which is developed to read in an update signal 112 which includes an item of information 114 about an area 116 of digital map 102 to be updated. According to this exemplary embodiment, update signal 112 is transmitted to vehicle 104 in a wireless manner. Read-in device 110 is developed to extract from update signal 112 item of information 114 about region 116 to be updated and to make it available to a determination device 118. Determination device 118 is developed to use item of information 114 in order to determine an adjustment signal 120, which is suitable to adjust a detection range of environment sensor 106 in such a way that environment sensor 106 is able to detect and image a section 122 of the environment of vehicle 104 that corresponds to area 116 of digital map 102 to be updated. Environment sensor 106 or a supply device linked to environment sensor 106 is developed to supply area data 124 for updating digital map 102. Area data 124 includes an image of section 122 of the environment of vehicle 104 detected by sensor 106. According to this exemplary embodiment, area data 124, or a signal 126 that includes area data 124 or data derived therefrom, is output to management device 108 via an interface of vehicle 104 and used by management device 108 for updating region 116 of digital map 102 to be updated.

According to one exemplary embodiment, device 100 only includes determination device 118 and a sensor-internal or sensor-external supply device for the supply of area data 124. According to further exemplary embodiments, device 100 additionally includes read-in device 110 and/or sensor 106 and/or management device 108. In addition to sensor 106, vehicle 104 may include further sensors, which are able to be used in addition or as an alternative to sensor 106 for ascertaining area data 124.

According to one exemplary embodiment, vehicle 104 includes a driver-assistance system 128, which, for instance, uses data supplied by environment sensor 106 in order to carry out a driving task. According to one exemplary embodiment, device 100 has a checking device, which is developed to check whether driver-assistance system 128 is currently using environment sensor 106 or will use it at a time when section 122 turns up in the detection range of environment sensor 106. If such a use is present, adjustment device 118 is developed not to determine adjustment signal 120, or at least not to supply it, in order to avoid an adverse effect on the operation of driver-assistance system 128.

According to one exemplary embodiment, vehicle 104 includes a position-determination device 130, which is developed to supply adjustment device 118 with a position signal 132, which includes data pertaining to a position and driving direction or an orientation of vehicle 104.

Adjustment device 118 is developed to determine adjustment signal 120 with the aid of position signal 132. Adjustment device 118 may use position signal 132 in order to estimate when and in which manner section 122 is able to be detected by environment sensor 106.

An exemplary embodiment, in which the described approach is used for highly and fully automated systems, will be described in greater detail in the following text. A management device 108 is used, which is developed as a back end server 108, or back end in abbreviated form. The communication of back end server 108 with vehicles such as illustrated vehicle 104 for the selective updating of certain map areas 116 is carried out with the aid of a variable field of view (FOV) of the sensor system of vehicle 104 including at least sensor 106. According to one exemplary embodiment, the field of view is defined by the range and the opening angle of sensor 106.

Systems for automating a vehicle control may be subdivided into different stages based on their degrees, i.e. from manual to fully automated (see BASt (Bundesanstalt für Straßenverkehr) classification) (translated as Federal Highway Research Institute). A characteristic of the "partial automation" stage is that the system is able to assume both the linear and transverse control in certain situations and for a certain period of time. The driver must monitor the system on a permanent basis and always be prepared to take full control of the vehicle guidance. Fully automated systems are characterized in that the vehicle is driving autonomously and without intervention on the part of the driver.

For localization purposes and a situation analysis, fully automated systems require a detailed map 102 of their environment, which is stored on back end server 108, for example, and may be called up by vehicles 104 when the need arises. However, in order to allow for reliable and safe driving, this map 102 should always be kept up-to-date. To set up the map, the described approach advantageously no longer requires that a vehicle equipped with a special reference-sensor system travel the route repeatedly in order to record data that will then be used to generate map 102.

Since this map preparation process is very time-consuming and expensive, a different solution is used according to the approach described here.

After vehicles 104 have been provided with an initial map 102, which was recorded using a reference sensor system, for example, the vehicle-installed sensors 106, which may be embodied as a radar sensor, lidar sensor, video sensor and/or an ultrasonic sensor, for instance, are used to detect deviations between the environment and map 102. These deviations are loaded into back end 108 where they are utilized to update map 102. The possibility of sensor generations that are able to selectively adapt the field of view, i.e. the range and the opening angle, and thus may achieve a higher information density by focusing on certain areas, is exploited in this context.

The present invention describes a method by which back end 108 is able to selectively instruct vehicles 104 to ascertain information 124 pertaining to certain areas 122 of the vehicle environment with the aid of vehicle sensor system 106. More specifically, the ability of the particular sensors 106 that are able to adjust their field of view in a variable and continuous manner is utilized for this purpose.

The described approach makes it possible for a back end server 108 that supplies maps 102 for highly automated driving to selectively instruct vehicles 104 to collect information about certain areas in the environment of vehicle 104, if possible. In this way, map 102 is able to be kept up-to-date via the vehicle fleet on the road. An expensive updating via reference vehicles is therefore able to be dispensed with.

In an advantageous manner, the described approach described offers the possibility of instructing sensors 106 that are not used for the current driving task to adapt their field of view in such a way that areas 122 about which further information is required are illuminated.

In the process, both sensors 106 which are able to modify their field of view only to a limited extent, i.e. the range and opening angle, and sensors 106 which are able to adapt their field of view in a variable and continuous manner, are able to be utilized.

Most vehicle actions do not require the information from all environment sensors 106. In the case of a vehicle 104 which, for instance, is equipped with a radar sensor 106 at each corner, only the information from the radar sensors situated on one side will be important during a lane change. Back end 108 is now able to selectively instruct sensors 106 that are not in use to adjust their field of view in such a way that areas 122 about which further information is required are illuminated. For example, in the case of radar sensors 106, an area 122 at a greater distance is able to be illuminated by reducing the opening angle. If information from the near region is of interest, then radar sensor 106 may be instructed to illuminate the broadest possible opening angle.

Back end 108 informs vehicle 104 of the particular areas 122 of the current route for which further information is required. Based on the current driving action and the number or position of sensors 106 that are not in use just then, vehicle 104 decides on its own whether it is possible to obtain information about these areas 122 in a selective manner. If this is the case, data 124 are transmitted to the back end, where the data is used for updating map 102.

Figure 2:
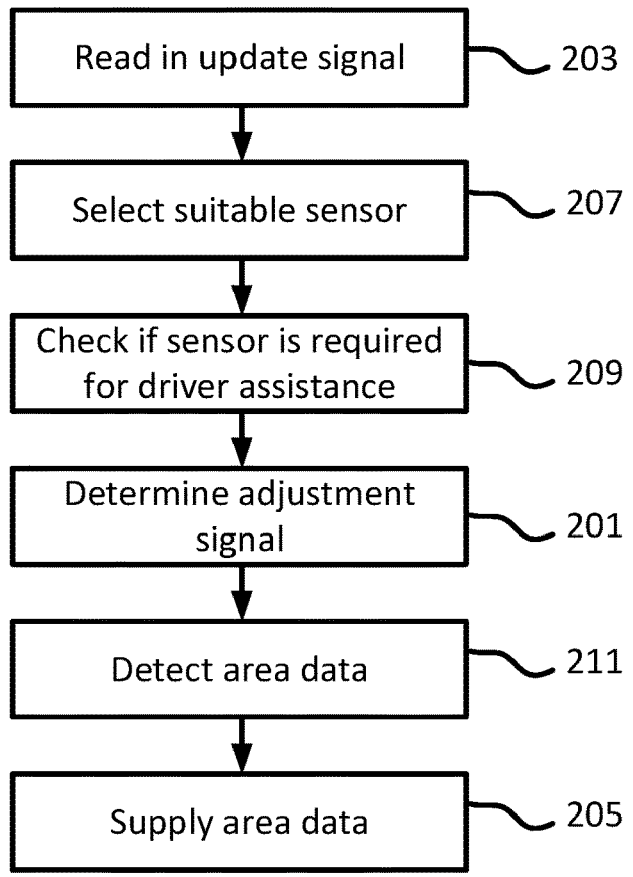
FIG. 2 shows a flow diagram of a method for updating a digital map for vehicle navigation according to an exemplary embodiment.

FIG. 2 shows a flow diagram of a method for updating a digital map for vehicle navigation according to one exemplary embodiment. The present method is able to be carried out using the device, or some of the devices, described with the aid of FIG. 1.

In a step 201, an adjustment signal is determined, which is suitable to adjust a detection range of an environment sensor of a vehicle to a section of an environment of the vehicle that corresponds to an area of the digital map to be updated. An item of information about the area to be updated is used in the process. In a step 203, the information is optionally read in in the form of an update signal that includes the information. Based on an image of the section of the environment detected by the environment sensor, area data are supplied in a step 205, which may be used for updating the digital map.

In a step 207, the information about the area to be updated is optionally used for selecting a suitable environment sensor from among a plurality of sensors of the vehicle. Also optionally, it is checked in a step 209 whether the environment sensor is required by a driver-assistance system. Depending on whether or not the environment sensor is indeed required, the determination of the adjustment signal is either executed or not executed in step 201.

According to one exemplary embodiment, the present method furthermore includes a step 211 in which the area data supplied in step 205 are detected with the aid of the environment sensor.

If an exemplary embodiment includes an "and/or" linkage between a first feature and a second feature, then this should be read as indicating that the exemplary embodiment according to one embodiment includes both the first feature and the second feature and according to a further embodiment, includes either only the first feature or only the second feature.

What is claimed is:

1. A method for updating a digital map for vehicle navigation, comprising:
   performing an operation for driving of the vehicle based on sensor signals of an environment sensor of the vehicle;
   receiving, by the vehicle, an update signal indicating an area of the digital map that is to be updated;
   based on the received update signal, determining an adjustment to a configuration of the environment sensor for optimizing a detection range of the environment sensor to sense a region corresponding to the area indicated by the update signal;
   based on the determination, the vehicle adjusting the configuration of the environment sensor;
   obtaining, by the environment sensor while configured with the adjusted configuration, area data regarding the region; and
   supplying, by the vehicle, the area data obtained by the environment sensor to a vehicle-external management device for updating the area of the digital map indicated by the update signal.

2. The method as recited in claim 1, wherein the update signal is received via an interface to the vehicle-external management device.

3. The method as recited in claim 1, further comprising, based on the update signal, determining which of a plurality of environment sensors is suitable for obtaining the area data relevant for the updating, and accordingly selecting the environment sensor from the plurality of environment sensors to obtain the area data.

4. The method as recited in claim 1, wherein the adjustment of the configuration is an adjustment of an opening angle of the environment sensor.

5. The method as recited in claim 1, wherein the step of determining the adjustment to the configuration is performed based on a position signal that indicates a current position and an orientation of the vehicle.

6. The method as recited in claim 1, wherein the area data includes an image of the region sensed by the sensor.

7. The method as recited in claim 1, further comprising:
subsequent to the updating of the area of the digital map, controlling a drive of the vehicle based on the updated area of the digital map.

8. The method as recited in claim 1, further comprising:
prior to the adjusting, determining whether the sensor is required to be used for the operating of the vehicle, wherein the adjusting of the configuration is performed conditional upon that a result of the determination regarding the required use of the sensor is that the sensor is not required to be used for the operating.

9. A vehicle configured for updating a digital map for vehicle navigation, comprising:
an environment sensor;
an interface to a vehicle-external management device; and
a control unit;
wherein:
the control unit is configured to perform an operation for driving of the vehicle based on sensor signals of the environment sensor of the vehicle;
the vehicle is configured to receive, by the vehicle and via the interface, an update signal indicating an area of the digital map that is to be updated;
based on the received update signal, the control unit is configured to determine an adjustment to a configuration of the environment sensor for optimizing a detection range of the environment sensor to sense a region corresponding to the area indicated by the update signal;
based on the determination, the control unit is configured to adjust the configuration of the environment sensor;
the environment sensor, while configured with the adjusted configuration, is configured to obtain area data regarding the region; and
the vehicle is configured to supply, via the interface, the area data obtained by the environment sensor to the vehicle-external management device for updating the area of the digital map indicated by the update signal.

10. A non-transitory machine-readable memory medium on which is stored a computer program that is executable by a processor and that, when executed by the processor, causes the processor to carry out a method for updating a digital map for vehicle navigation, the method comprising:
performing an operation for driving of the vehicle based on sensor signals of an environment sensor of the vehicle;
receiving an update signal indicating an area of the digital map that is to be updated;
based on the received update signal, determining an adjustment to a configuration of the environment sensor for optimizing a detection range of the environment sensor to sense a region corresponding to the area indicated by the update signal;
based on the determination, adjusting the configuration of the environment sensor;
obtaining area data regarding the region sensed by the environment sensor while the environment sensor is configured with the adjusted configuration; and
supplying the area data obtained by the environment sensor to a vehicle-external management device for updating the area of the digital map indicated by the update signal.

* * * * *